W. E. DELEHANTY.
AUTOMOBILE TIRE.
APPLICATION FILED JAN. 10, 1913.
1,085,408.
Patented Jan. 27, 1914.
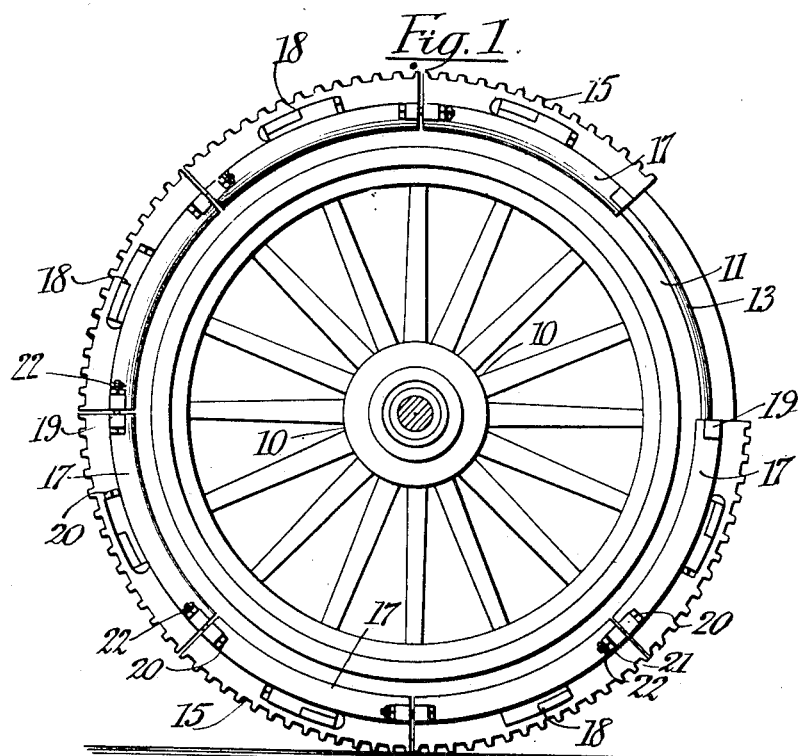
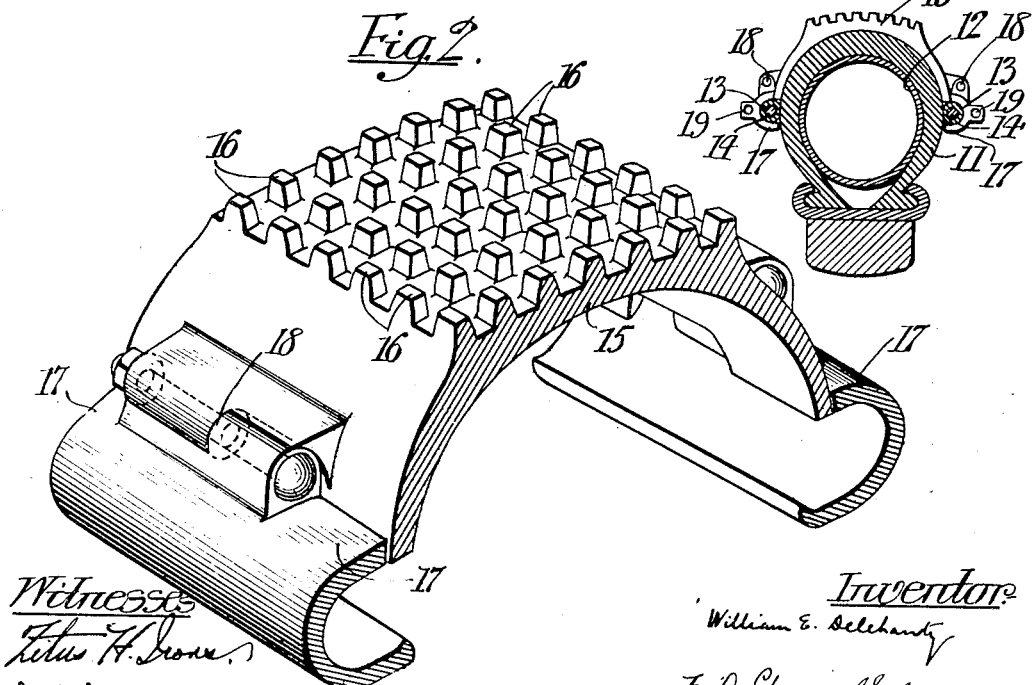
Witnesses
Titus H. Trone
G. H. Empey
Inventor
William E. Delehanty
By Clarence Dalton
His Attorney

UNITED STATES PATENT OFFICE.

WILLIAM E. DELEHANTY, OF NEW YORK, N. Y.

AUTOMOBILE-TIRE.

1,085,408. Specification of Letters Patent. Patented Jan. 27, 1914.

Application filed January 10, 1913. Serial No. 741,216.

*To all whom it may concern:*

Be it known that I, WILLIAM E. DELEHANTY, a citizen of the United States, residing in New York city, in the county of New York and State of New York, have invented a new and useful Improvement in Automobile-Tires, of which the following is a specification.

This invention relates to automobile tires, and the object is to provide an attachable anti-slipping tread, which is of simple, light, cheap and durable construction and easy of application and removal, and which will effectually prevent slipping. To this end I employ a solid metal tread, made of some light and tough metal or alloy and having anti-slipping projections formed integrally on it. This tread is made in arc sections, and means are provided for assembling them around the wheel. In the preferred construction the tire is provided with lateral ribs or projections, and the tread sections have hinged side portions constructed to hook over these ribs, the hinged side portions of adjacent sections being connected so as to unite the sections and prevent their side portions swinging out of engagement with the ribs.

In the accompanying drawings illustrating the invention: Figure 1 is an elevation of an automobile wheel and tire with the tread applied thereto, one section of the tread being omitted; Fig. 2 is a perspective sectional view on an enlarged scale showing one of the sections; and Fig. 3 is a cross-section on a different scale through the wheel, rim, tire and tread.

In these views, numeral 10 indicates the wheel, and 11 is the shoe of a pneumatic tire having the inner tube 12. This pneumatic tire may be of any suitable or approved construction and may be mounted on the wheel in any usual manner. It is provided, however, with side ribs 13, which are formed integral with or secured to the shoe 11 in any suitable manner, and are preferably reinforced by metal cores 14 constituting rods or cables extending all the way around the tire.

The tread is made in sections, of which there may be any suitable number. Each section comprises a tread portion 15 having integral anti-slipping projections 16, the whole being made by casting in one piece. The tread portion is extended down on the sides of the tire for a distance, and to it are hinged hooked side portions 17 for engagement with the ribs 13, the parts being hinged together as shown at 18, or in any suitable manner. The adjoining ends of the hinged side portions 17 are provided with lugs 19 having alined apertures, through which are passed connecting bolts 20 having nuts 21 which may be retained by cotter pins 22. Preferably the sections are connected together comparatively loosely.

While the tread may be made of any suitable metal or alloy having the requisite properties of strength without being too heavy, I find that the alloy known as aluminized steel serves very well. This material is light and fully able to withstand all the stresses imposed upon it when used for a tire tread, and is comparatively cheap.

What I claim as new is:

1. In combination with a tire having projections on its sides, an armor consisting of solid channeled sections adapted to fit the tread portion of the tire, and hooked side members hinged to said channeled tread sections and adapted to engage said tire projections.

2. In combination with a tire having projections on its sides, an armor consisting of solid channeled sections adapted to fit the tread portion of the tire, hooked side members hinged to said channeled tread sections and adapted to engage said tire projections, and means for connecting said side members together.

In witness whereof, I have hereunto set my hand this 6th day of January, 1913.

WILLIAM E. DELEHANTY.

Witnesses:
G. H. ESPEY,
ARTHUR WATSON.

Copies of this patent may be obtained for five cents each, by addressing the "Commissioner of Patents, Washington, D. C."